United States Patent [19]
Yazaki

[11] 3,791,481
[45] Feb. 12, 1974

[54] ECHO-NOISE ABSORPTION DEVICE

[76] Inventor: Hitoshi Yazaki, 12-6 Minami Aoyama 4-chome, Minato-ku, Tokyo, Japan

[22] Filed: July 25, 1973

[21] Appl. No.: 382,594

[52] U.S. Cl............... 181/33 R, 74/443, 181/33 A, 181/33 G
[51] Int. Cl............................................. E04b 1/84
[58] Field of Search... 181/33 R, 33 A, 33 M, 33 G; 74/443; 295/7

[56] References Cited
UNITED STATES PATENTS

| | | | |
|---|---|---|---|
| 1,689,052 | 10/1928 | Rogers | 181/33 M UX |
| 1,819,266 | 8/1931 | Rued | 74/443 |
| 2,483,007 | 9/1949 | Higham | 181/33 A UX |
| 2,541,159 | 2/1951 | Geiger | 181/33 R |
| 3,016,971 | 1/1962 | McPherson | 181/33 R |
| 3,581,593 | 6/1971 | Robinson | 74/443 |

Primary Examiner—Richard B. Wilkinson
Assistant Examiner—John F. Gonzales
Attorney, Agent, or Firm—Hammond & Littell

[57] ABSTRACT

An echo-noise absorption device for absorbing echo-noise which is generated from a moving metal machine part or transmitted from said moving machine metal part through another stationary machine metal part comprising at least one echo noise absorption unit which includes a soft metal echo-noise absorption element having one face to be applied to the adjacent surface of said moving machine metal part or stationary metal machine part; a non-metal anti-noise transmission element in contact with the face of said soft metal element opposite to said machine part contact face; a cup-shaped cover surrounding the entire periphery and the face of said non-metal element opposite to said soft metal element and portion of the periphery of said metal element; and a fastening means extending through said soft metal and non-metal elements and cover so as to fixedly secure the elements and cover together to said moving or stationary machine part.

14 Claims, 11 Drawing Figures

PATENTED FEB 12 1974

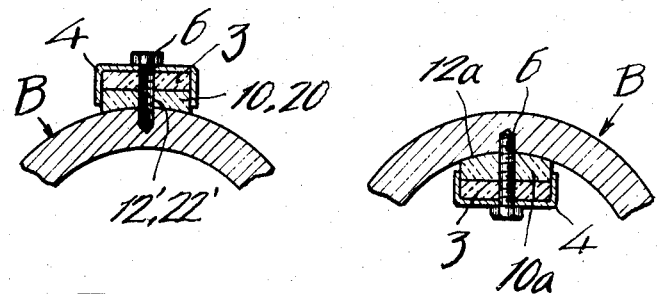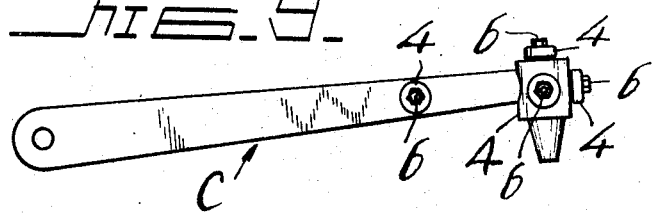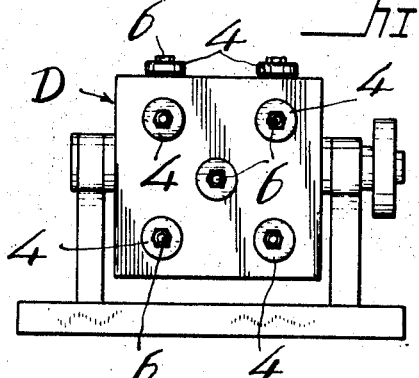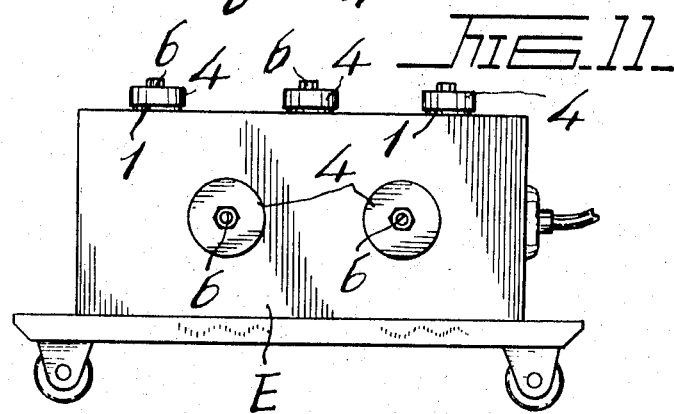

ECHO-NOISE ABSORPTION DEVICE

BACKGROUND OF THE INVENTION

This invention relates to an echo-noise absorption device which is adapted to be applied to a moving metal machine part or a stationary metal machine part so as to absorb echo-noise to be generated from the moving machine part or to be transmitted from the moving machine part through the stationary machine part.

There are a number of prior art echo-noise absorption devices which are adapted to be applied to a moving metal machine part such as a gear or hammering machine tool, for example, or a stationary metal machine part such as the gear box of a transmission gear or the cover of an engine, for example, so as to absorb echo-noise to be generated from the moving machine part or to be transmitted from the moving part through the stationary machine part.

One type of the conventional echo-noise absorption device includes a resilient machine contact element formed of natrual or synthetic rubber which is adapted to be directly applied to a moving metal machine part or stationary metal part so as to absorb echo-noise to be generated from the moving machine part or to be transmitted from the moving metal machine part through the stationary machine part. Another type of prior art echo-noise absorption devices includes a metal machine part contact element which is adapted to be directly applied to a moving metal machine part or stationary metal machine part so as to absorb echo-noise to be generated from the moving machine part or to be transmitted from the moving machine part through the stationary machine part. Although such prior art echo-noise absorption devices have successfully performed their intended purpose to some degree, they have not been perfectly satisfactory. In addition, the prior art echo-noise absorption devices were rather complicated in construction and rather expensive.

SUMMARY OF THE INVENTION

Therefore, one of the principal objects of the present invention is to provide an improved echo-noise absorption device which is improved over the prior art echo-noise absorption devices referred to above.

Another one of the principal objects of the present invention is to provide an improved echo-noise absorption device which is simple in construction and less expensive.

According to the present invention, the improved echo-noise absorption device generally comprises at least one unit which includes as its principal parts a soft metal element having one face adapted to be directly applied to the adjacent surface of a moving metal machine part or stationary metal machine part; a resilient non-metal element in contact with the other face of the soft metal element opposite to the machine part contact face of the latter, a cup-shaped cover surrounding the entire exposed face and entire periphery of the resilient element and portion of the periphery of the soft metal element and a fastening means extending through said elements and cover thereby to fixedly secure the elements and cover together to the machine part.

Furthermore, according to the present invention, the soft metal element is preferably formed of lead and the resilient element is preferably formed of natural or synthetic rubber.

In addition, the machine part contact face of the soft metal element may be any desired configuration such as flat, concaved or convexed conical, or concaved or convexed arcuate depending upon a particular configuration of the surface of a metal machine part to which the soft metal element contact face is applied.

Still furthermore, according to the present invention, the echo-noise absorption unit of the above-mentioned type may be applied to each of the opposite surfaces of a moving metal machine part.

The above and other objects and attendant advantages of the present invention will be more readily apparent to those skilled in the art from a reading of the following description in conjunction with the accompanying drawings which show one preferred embodiment of the invention for illustration purpose only, but not for limiting the same in any way.

BRIEF DESCRIPTION OF THE DRAWINGS

FIG. 7 is a cross-sectional view of one of said echo-noise absorption units as being applied to the outer curved surface of a hollow cylindrical machine part;

FIG. 8 is a cross-sectional view of one of said echo-noise absorption units as being applied to the inner curved surface of said hollow cylindrical machine part of FIG. 7;

FIGS. 9, 10 and 11 are views showing different applications of the present invention.

PREFERRED EMBODIMENT OF THE INVENTION

Figure 1:
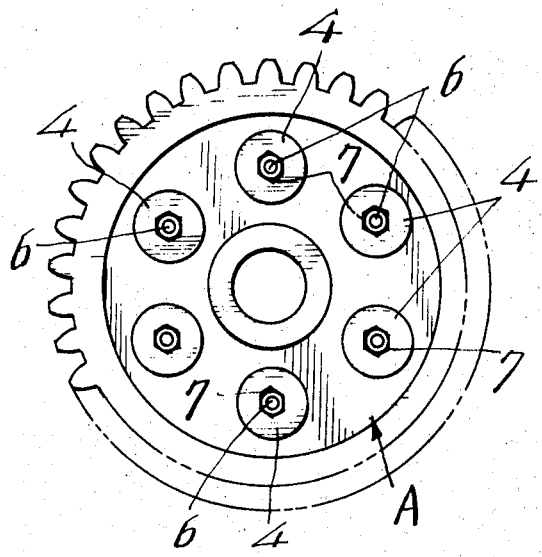
FIG. 1 is a plan view of a preferred embodiment of echo-noise absorption device of the present invention as being applied to the web of a gear.
Figure 2:
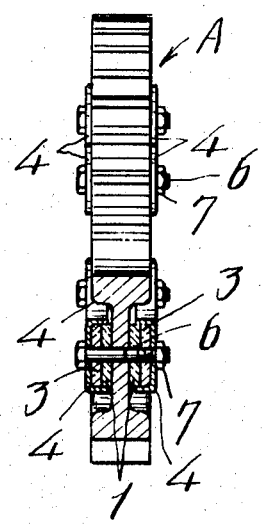
FIG. 2 is a side elevational view of FIG. 1 in partial section.
Figure 3:
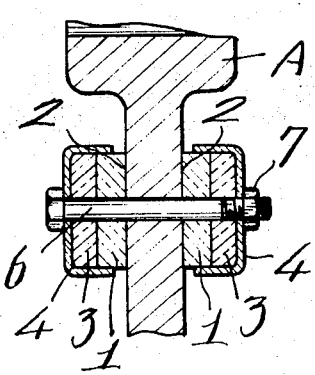
FIG. 3 is an enlarged sectional view of portion of FIG. 2.

The present invention will be now described referring to the accompanying drawings which show one preferred embodiment of the invention and more particularly, to FIGS. 1 through 3 thereof. The illustrated echo-noise absorption device is shown as being applied to a machine part or parts such as a gear or gears A. The echo-noise absorption device comprises a pair of similar echo-noise absorption units which are symmetrical to each other. Since the pair of units are similar to each other, only one of the units will be in detail described referring to FIGS. 1 through 3. The echo-noise absorption unit includes a flat disc-shaped soft metal echo-noise absorption element 1 formed of lead, for example and having one or inner contact face 2 which is adapted to be applied to the adjacent surface of the web of the gear A which has an opening and a center opening 1'; a flat disc-shaped resilient non-echo-noise transmission element 3 formed of non-metal such as natural or synthetic rubber which is in contact on one or inner face with the face of the echo-noise absorption element 1 opposite to the contact face 2 of the latter and has a center opening 3' in alignment with the center opening 1' in the element; and a cup-shaoed in alignment with the opening in the gear web cover 4 which covers the entire periphery and the outer face of the non-echo-noise transmission element 3 and portion of the periphery of the echo-noise absorption element 1. For the purpose, the cover 4 comprises the substantially closed circular bottom 4' having a center opening 4'' in alignment with the center openings 1' and 3' in the elements 1 and 3 and the cylindrical side wall 4''' the free or inner end of which normally terminates short of the adjacent surface of the gear web resilient non-echo-noise.

In use, the pair of echo-noise absorption units as described hereinabove are applied to the opposite surfaces of the web of the gear A with the center openings in the various elements of one unit in alignment with the center openings in the corresponding elements of the other unit and the covers of both the units being disposed outward as shown in FIGS. 2 and 3. Thereafter, a fastening means such as a bolt 6 having the opposite threaded end portions is passed through the various elements of one unit, the gear web and the various elements of the other unit and nuts 7 are finally threaded onto the threaded opposite ends of the bolt 6 whereby the pair of echo-noise absorption units are fixedly secured together to the gear and any echo-noise which may be generated when the gear is rotated can be effectively absorbed by the echo-noise absorption device of the invention.

It is to be understood that only one echo-noise absorption unit on only one surface of a moving machine part may be employed or two or more pairs of echo-noise absorption units may be employed on the opposite sides of the machine part depending upon the size of the machine part to which the present invention is applied or the volume of noise to be generated from such a machine part without departing from the spirit of the present invention.

Figure 5:
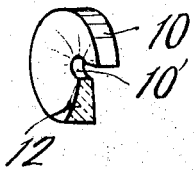
FIG. 5 is a perspective view of a modified form of metal element.
Figure 6:
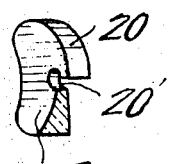
FIG. 6 is a perspective view of a further modified form of metal element.
Figure 4:
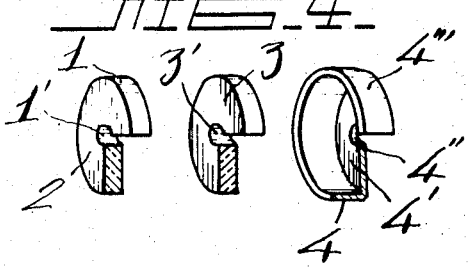
FIG. 4 is a perspective view in partial section of one of a pair of echo-noise absorption units comprising a metal element, a rubber element and a cover of said echo-noise absorption device.

FIG. 5 shows a modified form of echo-noise absorption element 10 which is employed in conjunction of the other elements of the echo-noise absorption unit as described hereinabove and adapted to be applied to a curved surface of a machine part which may be movable or stationary. For the purpose, the soft metal echo-noise absorption element 10 has one concaved cone shaped face 13 which is adapted to be applied to the mating curved face of the machine part. The element 10 is also provided with a center opening 10' which is in alignment with the corresponding openings in the other elements of the associated echo-noise absorption unit. FIG. 6 shows a further modified form of a soft metal echo-noise absorption element 20 which is also employed in conjunction with the other elements of the echo-noise absorption unit as described hereinabove and also adapted to be applied to a different curved surface of a machine part. To the end, the soft metal echo-noise absorption 20 has one concaved arcuate surface 22 which is adapted to be applied to the particular curved surface of a machine part. Since the element 1, 10 or 20 which is adapted to contact directly a machine metal part is formed of soft metal such as lead which substantially absorbs noise from the applied machine metal part and the element 3 is formed of non-metal non-noise transmission material such as natural or synthetic rubber which yieldingly applies the soft metal element against the associated machine metal part when subjected to the compressive force by the fastening means, the noise from the machine part can be perfectly prevented from being transmitted to the surrounding environment.

Although not shown, the metal part contact face 12 or 22 of the soft metal element 10 or 20 (FIG. 5 or 6) may be of convexed conical or arcuate configuration depending upon the configuration of a surface of a metal machine part to which the element is applied.

FIG. 7 shows an instance in which the echo-noise absorption unit including the soft metal element 10 or 20 having the cone-shaped or curved surface 12 or 22 is applied to the outer periphery of a cylindrical machine part B with the cone-shaped or curved face 12 or 22 abutting against the outer periphery.

FIG. 8 shows an instance in which the echo-noise absorption unit including the soft metal element 10a having the convexed machine part contact face 12a is applied to the inner periphery of the cylindrical machine part B with the convexed face abutting against the inner periphery.

FIG. 9 show an instance in which a plurality of echo-noise absorption units of the invention are applied to suitable or desired points of the shank of a hammering machine tool.

FIG. 10 shows an instance in which a plurality of echo-noise absorption units of the invention are applied to suitable or desired points of the gear box of a transmission gear.

FIG. 11 shows an instance in which a plurality of echo-noise absorption units of the invention are applied to suitable or desired points of the cover of an engine.

As seen from the above, according to the present invention, since the echo-noise absorption unit comprises a relatively small number of elements and the elements can be readily assembled and applied to a moving or stationary machine part by a single fastening element, the unit is quite simple in construction and less expensive. Thus, it is believed that the present invention will greatly contribute to the art.

While only one embodiment of the invention has been shown and described in detail, it will be understood that the same is for illustration purpose only and not to be taken as a definition of the invention, reference being had for the purpose to the appended claims.

What is claimed is:

1. An echo-noise absorption device for absorbing echo-noise which is generated from a moving metal machine part or transmitted from said moving metal machine part through a stationary metal machine part comprising at least one echo-noise absorption unit which includes a soft metal echo-noise absorption element having one face to be applied to the adjacent surface of said machine part; a non-metal resilient anti-noise transmission element in contact with the face of said soft metal element opposite to said machine part contact face of the latter; a cup-shaped cover surrounding the entire periphery and the face of said non-metal element opposite to said soft metal element and portion of the periphery of the soft metal element; and a fastening means extending through said soft metal and non-metal elements and cover so as to fixedly secure said elements and cover together to said adjacent surface of the machine part.

2. The echo-noise absorption device as set forth in claim 1, in which said moving metal machine part is a gear.

3. The echo-noise absorption device as set forth in claim 1, in which said moving metal machine part is the shank of a hammering machine tool.

4. The echo-noise absorption device as set forth in claim 1, in which said stationary metal machine part is the gear box of a transmission gear.

5. The echo-noise absorption device as set forth in claim 1, in which said stationary metal machine part is the cover of an engine.

6. The echo-noise absorption device as set forth in claim 1, in which said soft metal echo-noise absorption element is formed of lead.

7. The echo-noise absorption device as set forth in claim 1, in which said non-metal anti-transmission element is formed of natrual or synthetic rubber.

8. The echo-noise absorption device as set forth in claim 1, in which said metal machine part contact face of the soft metal echo-noise absorption element is flat.

9. The echo-noise absorption device as set forth in claim 1, in which said machine part contact face of the soft metal element is concaved or convexed conical.

10. The echo-noise absorption device as set forth in claim 1, in which said machine part contact face of the soft metal echo-noise absorption element is concaved or convexed arcuate.

11. The echo-noise absorption device as set forth in claim 1, in which a pair of said echo-noise absorption units as disclosed in claim 1 are applied to the opposite surface of said metal machine part.

12. The echo-noise absorption device as set forth in claim 1, in which said metal machine part has an opening and said soft metal and resilient elements and cover have coaxial openings in alignment with each other and with said opening in the machine part and said fastening means extends through said aligned openings so as to hold them together.

13. The echo-noise absorption device as set forth in claim 1, in which said soft metal and resilient elements are in the form of a disc.

14. The echo-noise absorption device as set forth in claim 1, in which said cover is in the form of a circular cup having the bottom which covers the exposed face of said resilient element and a cylindrical side wall which surrounds the entire periphery of said resilient element and portion of said resilient element terminating short of said surface of the metal machine part.

* * * * *